United States Patent [19]

Fukamachi et al.

[11] Patent Number: 4,643,351
[45] Date of Patent: Feb. 17, 1987

[54] ULTRASONIC HUMIDIFIER

[75] Inventors: Toshio Fukamachi, Tatebayashi; Kazuto Matsuda, Ora; Kouichi Noma, Ota; Toshiaki Kawada, Ora; Toshio Sakurai, Ashikaga; Takeshi Osawa, Yamada, all of Japan

[73] Assignee: Tokyo Sanyo Electric Co., Japan

[21] Appl. No.: 745,420

[22] Filed: Jun. 14, 1985

[30] Foreign Application Priority Data

Jun. 14, 1984 [JP] Japan .................. 59-122307
Jun. 26, 1984 [JP] Japan .................. 59-132597
Jul. 6, 1984 [JP] Japan .................. 59-102657
Jul. 20, 1984 [JP] Japan .................. 59-110637

[51] Int. Cl.$^4$ .............................. B01F 3/02
[52] U.S. Cl. .................. 236/44 E; 62/176.6; 73/336.5
[58] Field of Search ............ 236/44 E, 94, 44 A, 236/44 R; 62/176.6; 307/308; 73/29, 336.5; 374/170, 183; 165/16

[56] References Cited

U.S. PATENT DOCUMENTS

| | | | |
|---|---|---|---|
| 3,196,682 | 7/1965 | Johnson, Jr. | 236/44 E |
| 3,820,398 | 6/1974 | Rekai | 73/336.5 |
| 4,286,263 | 8/1981 | Lindberg | 374/170 X |
| 4,379,406 | 4/1983 | Bennewitz et al. | 73/336.5 |

Primary Examiner—William E. Wayner
Attorney, Agent, or Firm—Darby & Darby

[57] ABSTRACT

An ultrasonic humidifier for atomizing water in a vessel by an ultrasonic oscillator and supplying atomized water with air into a room by a blower comprising a humidity sensor detecting the humidity in the room and a thermosensor detecting the temperature in the room. The operation of said ultrasonic oscillator is controlled in such a manner that the value of the detected humidity compensated by said thermosensor may be set for the desired value.

8 Claims, 10 Drawing Figures

ULTRASONIC HUMIDIFIER

FIELD OF THE INVENTION

The present invention relates to an ultrasonic humidifier for atomizing water in a vessel by an ultrasonic oscillator and supplying atomized water into a room by a blower.

DESCRIPTION OF THE PRIOR ART

Ultrasonic humidifiers utilizing an ultrasonic oscillator have already been disclosed in U.S. Pat. No. 3,901,443 and Japanese Utility Patent Early Publications No. 56-86427 (1981). By the conventional humidifier of such type, however, a comfortable room humidity is not obtained since the humidifying operation is controlled by an output signal of a humidity sensor only.

Between the temperature and the humidity in a room, there is a close correlation so that the output signal of the humidity sensor varies depending not only on the humidity but also on the temperature. Thus, in the conventional humidifier, in which the output of the humidity sensor is directly used to control the humidifying operation, the higher the temperature the lower the humidity owing to the detection of the higher humidity by the humidity sensor while the lower the temperature the higher the humidity owing to the detection of the lower humidity by the humidity sensor so that a comfortable humidity has not been attainable.

SUMMARY OF THE INVENTION

It is therefore a general object of this invention to provide an ultrasonic humidifier being capable of controlling the humidity correctly under the presence of the variation of the room temperature.

Therefore, according to the present invention, there is provided an ultrasonic humidifier for atomizing water in a vessel by an ultrasonic oscillator and supplying atomized water into a room comprising a humidity sensor for detecting the humidity in the room, a thermosensor for detecting the temperature in the room, means for setting the humidity in the room as a desired value, means for compensating the humidity in which an output of the humidity sensor is compensated by the thermosensor, means for comparing the value of the humidity compensated by said means for compensating the humidity with the value of the humidity set by said means for setting the humidity in the room, and means for controlling the operation of said ultrasonic oscillator according to the compared result obtained by said means for comparing.

By such a construction of the ultrasonic humidifier, the output of the humidity sensor changing by the affections not only of the humidity but also of the temperature may be compensated to the correct value of the humidity by the output of the thermosensor so that the correct controlling of the room humidity may be enabled.

It is preferable to provide means for displaying the humidity in the room in response to the humidity compensated by said means for compensating the humidity so that the present room humidity is indicated correctly.

Furthermore, it is preferable to provide means for preferentially controlling the operation of said ultrasonic oscillator in such a manner that if the humidity is set for a value over the uppermost value, said ultrasonic oscillator will be operated continuously irrespective of the compared result obtained by said means for comparing. By such a construction, a rapid humidification irrespective of the output of said humidity sensor may be enabled.

According to the present invention, it is preferable to provide the humidity sensor in an air passage formed by said blower in the lower portion of said humidifier while to provide the thermosensor in a room humidity detecting chamber formed in such a manner that air in the room may also be sucked through a laterally shaped aperture provided on a side wall of the humidifier for slidably moving a humidity setting lever and may be flowed into said air passage. By such a construction, the correct value of the room temperature is detectable by the thermosensor so that the correct compensation of the output of the humidity sensor may be performed so as to the highly accurate control of the humidity may be enabled.

According to the present invention, it is preferable to provide the humidity sensor in such a manner that a sensing surface is covered with a casing provided with a circular aperture facing to said sensing surface and a ring shaped filter holder being attached with a filter inside the ring and being provided with a manipulating knob outside the ring is threadably engaged to said circular aperture. By such a construction, the attaching of dust or water droplet to the sensing surface may be effectively prevented thereby so that the humidity may be detected correctly. Furthermore, the attaching or detaching of the filter will easily be made and the structure of the humidity sensor is very simple.

According to the present invention, there may be provided said means for preferentially controlling the operation of the ultrasonic oscillator in addition to the provision of said means for displaying the humidity. It is then preferable to take said uppermost setting value as the uppermost value of said means for displaying the humidity.

Furthermore, according to the present invention, it is preferable to construct means for displaying the humidity by the provision of a plurality of displaying lamps. There is further provided a plurality of means for comparing respectively having different reference potential in turn and the value compensated by said means for compensating the humidity being fed to said plurality of means for comparing so as to displaying lamps being lighted in turn according to the result of comparing with the respective reference potentials.

BRIEF DESCRIPTION OF THE DRAWINGS

The invention will further be described by way of example, with reference to the accompanying drawings, in which.

DETAILED DESCRIPTION OF THE PREFERRED EMBODIMENT

Figure 1:
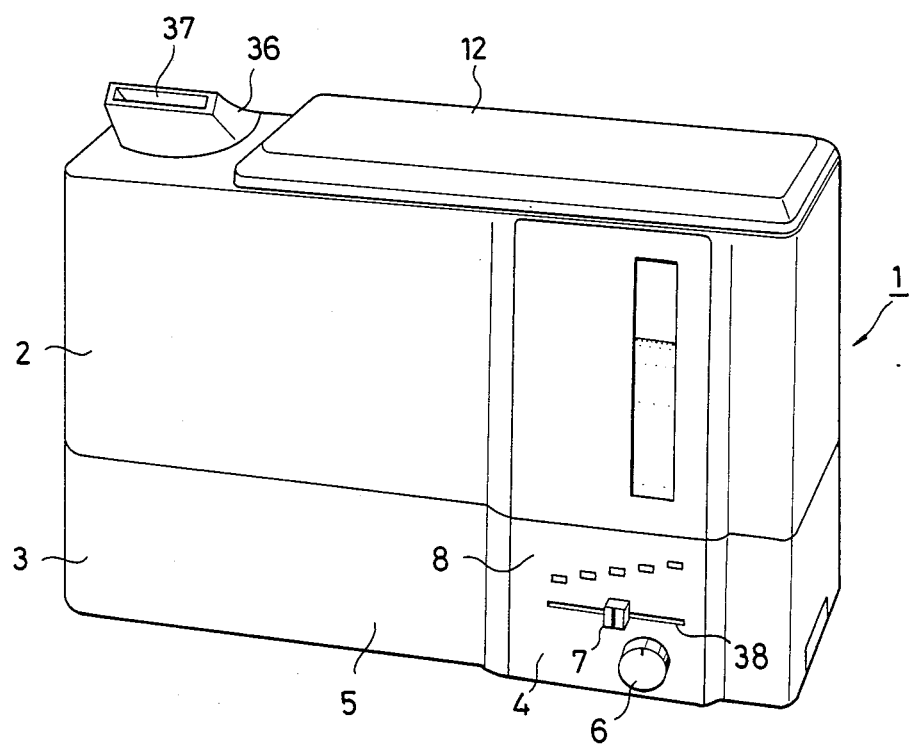
FIG. 1 is an outer perspective view showing a preferred embodiment of an ultrasonic humidifier of the present invention.

As shown in FIG. 1, an ultrasonic humidifier 1 according to the preferred embodiment of the present invention comprises an upper casing 2 and a lower casing 3. On the right-hand portion of front panel 5 of the lower casing 3, there is provided an operating portion 4. On the operating portion 4, a manipulating knob 6 to control the operation of the humidifier, a humidity setting lever 7 and a humidity displaying portion 8 are provided, as shown in more detail, in FIG. 2.

Figure 10:
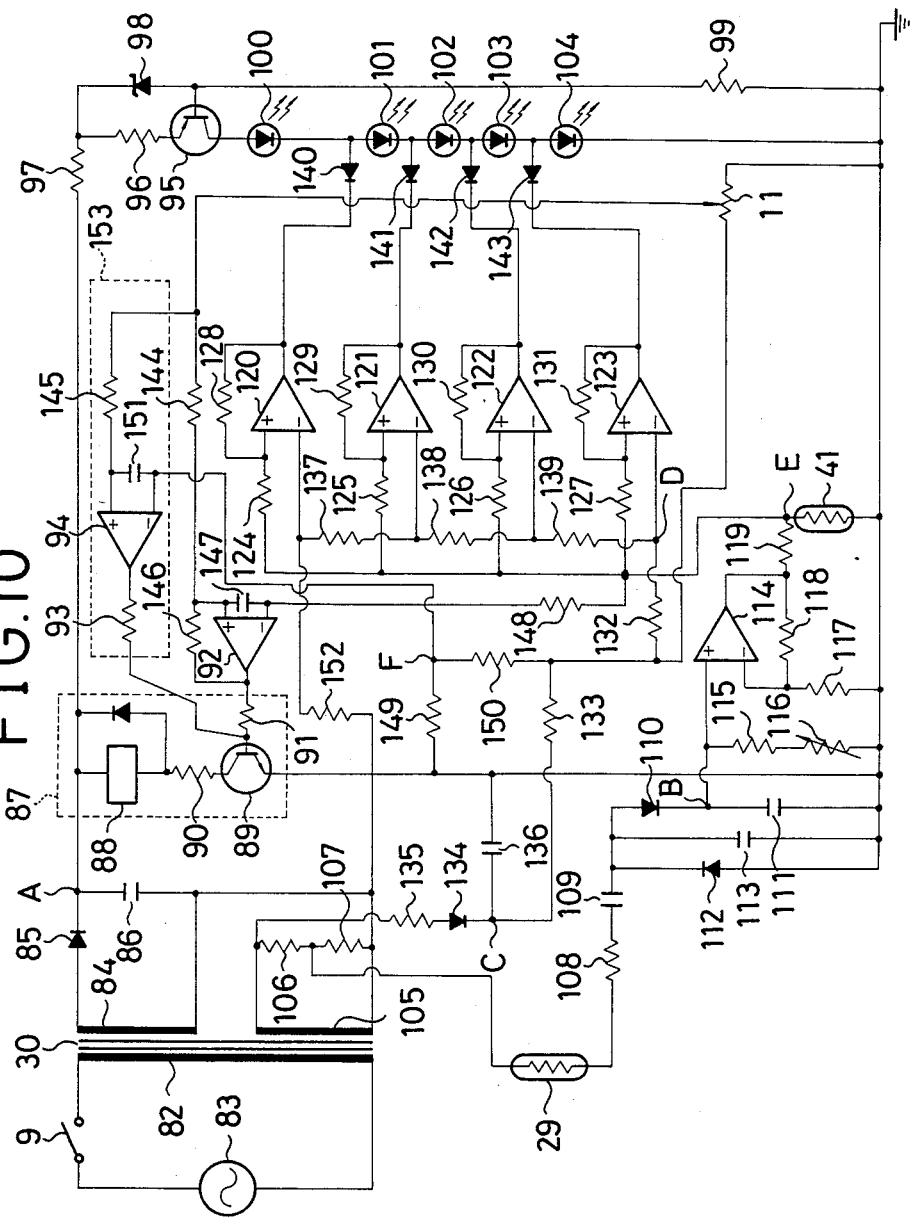
FIG. 10 is an electric circuit diagram of the humidifier of FIG. 1.

By operating the manipulating knob 6, a power supply switch 9 is closed and an ultrasonic oscillator circuit 10 (see FIG. 5) is controled, as will be described hereinafter with reference to FIG. 10, so as to the quantity of the splayed mist per minute is adjusted.

The humidity setting lever 7 is slidable side to side thereby the resistance of a variable resistor 11 (see FIG. 10) may be adjusted in such a manner that an arbitrary value of the humidity between 30% (lowermost value) to 70% uppermost value) may be set.

Furthermore, although the setting humidities from the lowermost value to the uppermost value are indicated by the letters in FIG. 2, these values may also be indicated by the figures as (30), (40), (50), (60) and (70) corresponding to the humidity displaying portion 8 which will be described here in after.

The humidity displaying portion 8 comprises light emitting diodes 100—104 sequentially emitting light in response to the room humidity, thus capable of displaying the room humidity between 30% to 70%.

On the upper casing 2, a cover member 12 is provided to open and close an opening 14 to allow the passage of a water feeding reservoir 13 (see FIG. 5) which is installed in the casing.

Figure 3:
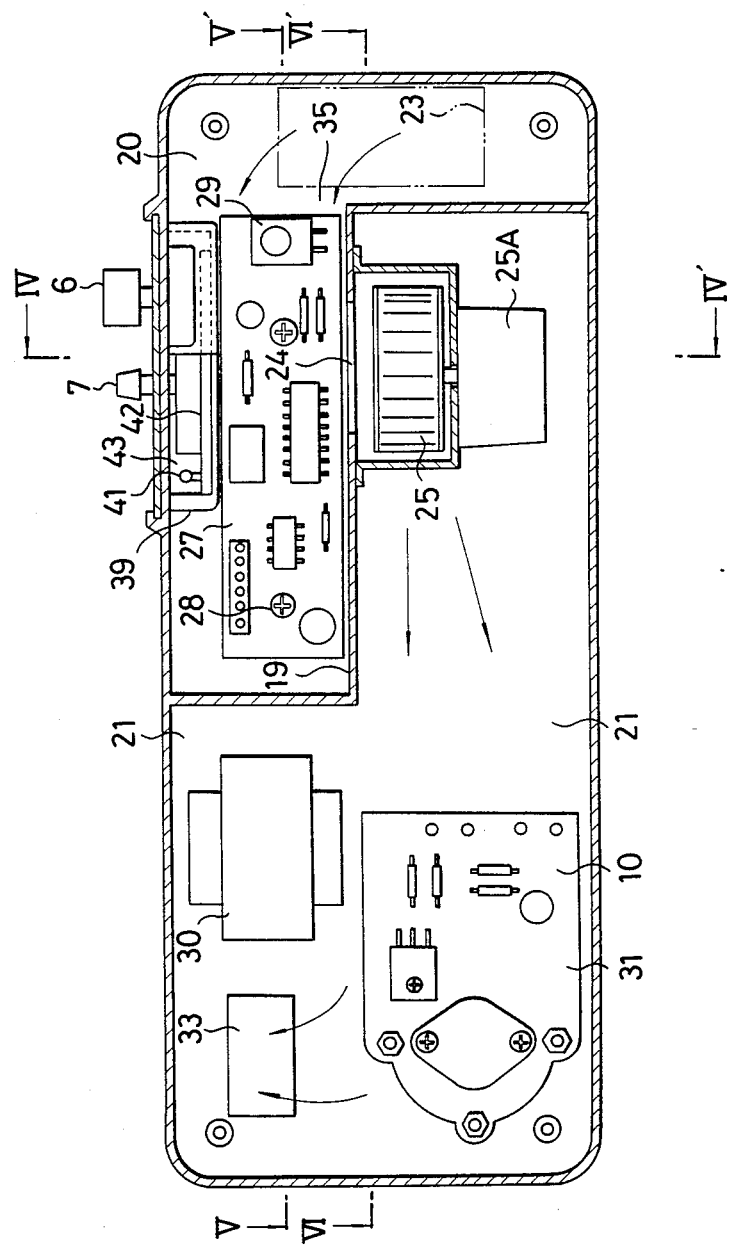
FIG. 3 is a schematic bottom view of the ultrasonic humidifier of FIG. 1.
Figure 5:
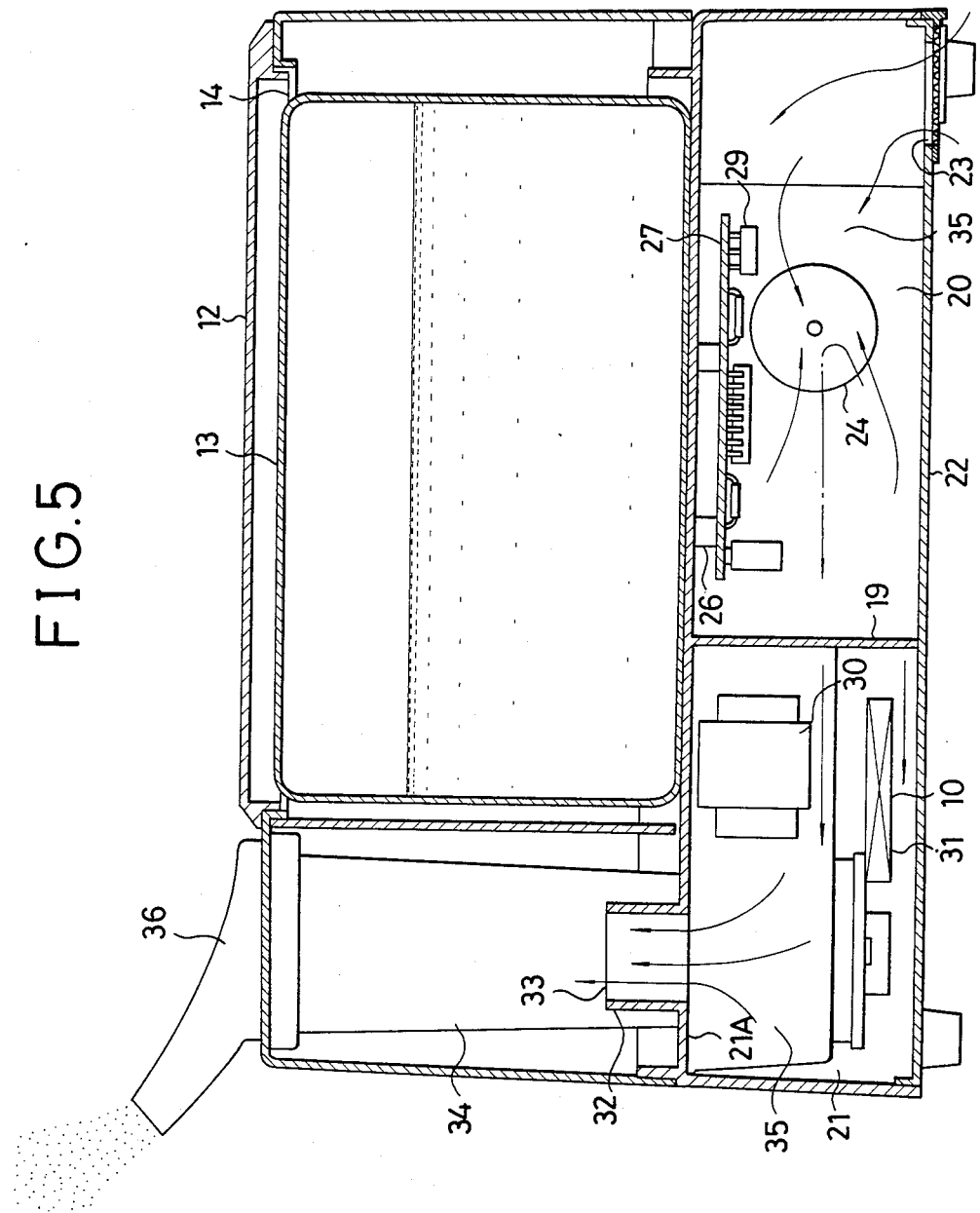
FIG. 5 is a schematic cross sectional view taken on line V—V' of FIG. 3.
Figure 6:
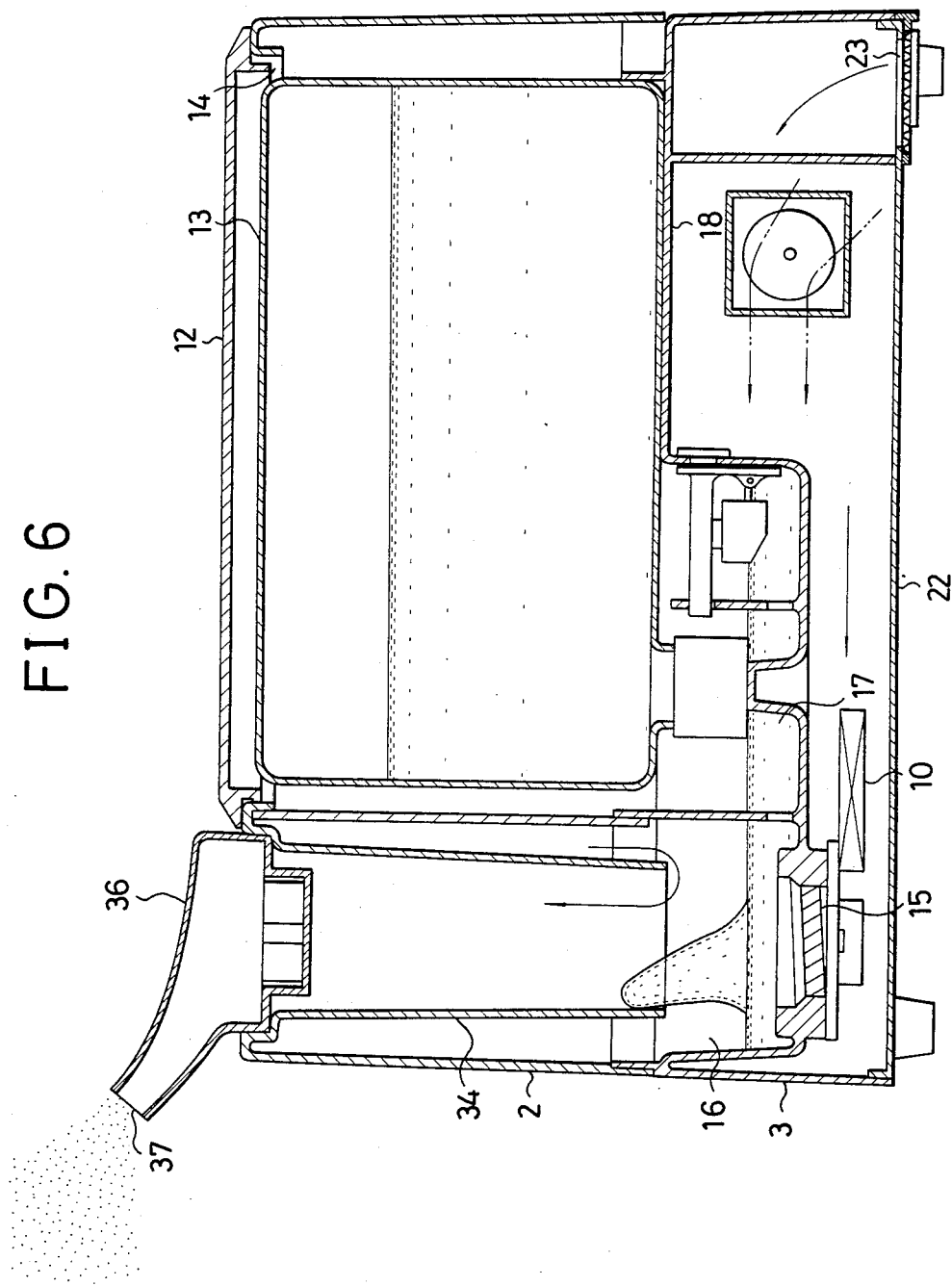
FIG. 6 is a schematic cross sectional view taken on line VI—VI' of FIG. 3.

As shown in FIG. 6, an atomizing vessel 16 equipped with an ultrasonic oscillator 15 on the lower surface thereof, an auxiliary reservoir 17 connected to the atomizing vessel 16 and supplied water from the water feeding reservoir 13, and a mounting member 18 for mounting the water feeding reservoir 13 are provided in the lower casing 3. The lower space in the casing 3 is devided by a partition wall 19 into an upper stream chamber 20 and a downstream chamber 21, as shown in FIGS. 3 and 5. The partition wall 19 has an aperture 24 (see FIGS. 3, 4 and 5) and a blower 25 is mounted on the downstream side of said partition wall 19 in order to guide a flow of room air sucked from an inlet 23 of a bottom plate 22 through the upper stream chamber 20 to the downstream chamber 21. Further, a circuit substrate 27 is attached by setscrews 28 to bosses 26 protrusively provided on the lower surface of said mounting member 18 in the upper stream chamber 20.

On the circuit substrate 27, there is attached a humidity sensor 29 detecting the room humidity. While the humidity sensor 29 is provided in the upper stream chamber 20, the blower 25, a stepdown transformer 30 and a substrate 31 mounted the ultrasonic oscillator circuit 10 thereon are provided in the downstream chamber 21 so that the thermal affection of these members to said humidity sensor 29 may effectively be prevented. Further, by arranging the humidity sensor 29 with the detecting surface thereof facing downward, dust or water droplets may hardly be clung to said detecting surface thereby the false operation of the humidity sensor 29 may effectively be prevented.

An air passage 35 is formed below the water feeding reservoir 13, as shown in FIGS. 5 and 6, in such a manner that room air sucked through the inlet 23 is guided through the upper stream chamber 20, the downstream chamber 21, an opening 33 of a cylindrical member 32 which is formed protruding upwardly on an upper wall 21A of the downstream chamber 21 and a space between the atomizing vessel 16 and an exhaust duct 34 into the atomizing vessel 16 whereby air flowed into the atomizing vessel 16 is forced upwardly through the exhaust duct 34 with atomized mist and exhausted into the room through an outlet 37 of a splaying duct 36.

Figure 4:
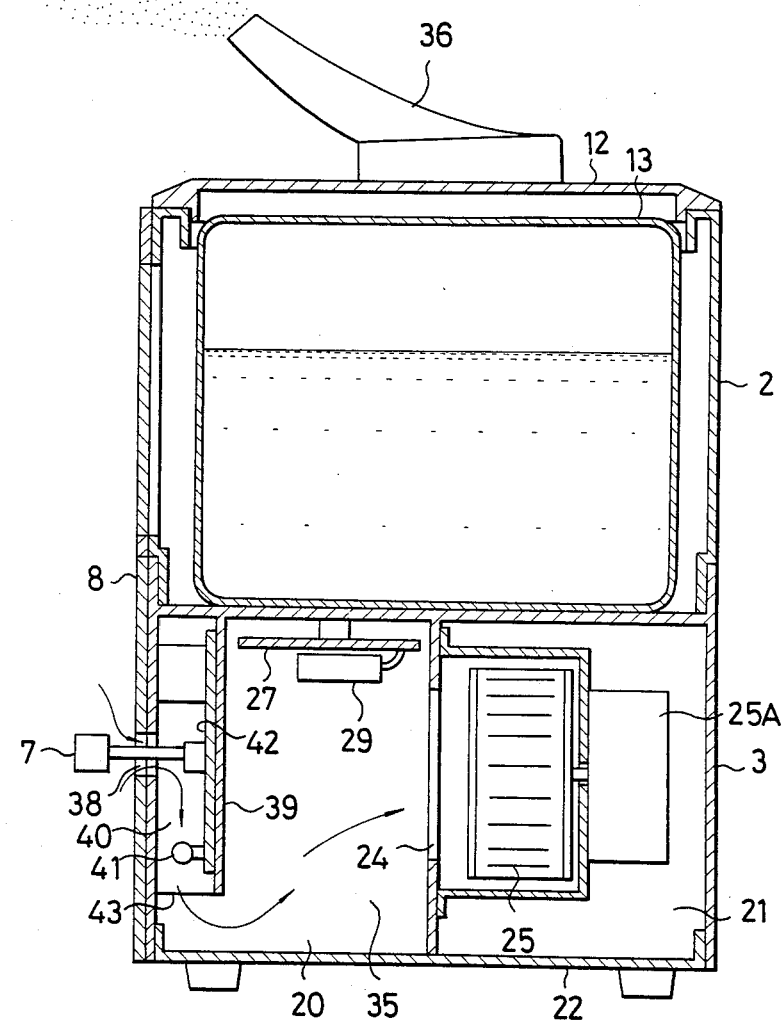
FIG. 4 is a schematic cross sectional view taken on line IV—IV' of FIG. 3.

On the operating portion 4, as shown in FIGS. 1 and 4, there are provided the manipulating knob 6 through an opening and the humidity setting lever 7 through a laterally shaped opening 38. Behind the manipulating portion 4, there is formed a room temperature detecting chamber 40 by a surrounding wall 39. On the surface of the surrounding wall 39 inside the detecting chamber 40, a circuit substrate 42 on which a thermosensor 41 detecting the room temperature and a variable resistor 11, the resistance thereof being variable by the humidity setting lever 7, are attached is vertically mounted. The bottom portion of the detecting chamber 40 is partially cut away to provide an opening 43 communicating to said air passage 35 so that room air may be sucked also from said laterally shaped opening 38 and flowed together with the air flow in said air passage 35. Because of the small dimension of said laterally shaped opening 38, said circuit substrate 42 may not be cooled by a small bit of room air sucked from the opening 38 so that the thermosensor 41 detects the room temperature correctly.

Since the humidity sensor 29 may be operated in response to the temperature as well as the humidity, the thermosensor 41 is used to detect the room temperature and compensate the output of the humidity sensor 29, as will be described hereinafter.

Figure 7:
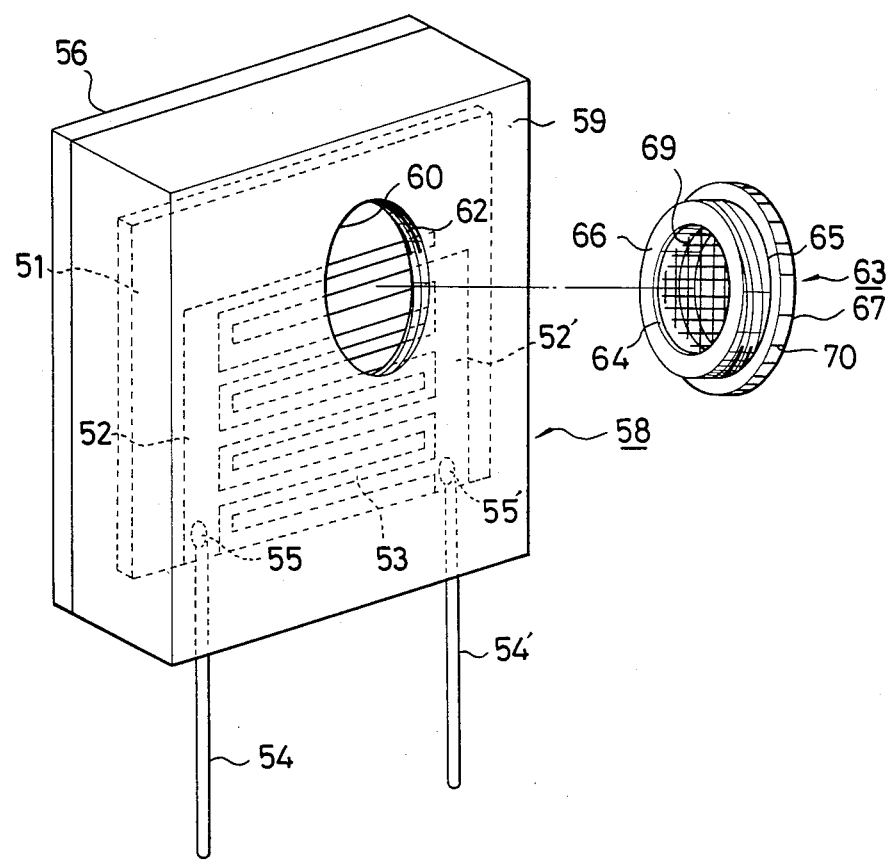
FIG. 7 is an exploded perspective view of a humidity sensor mounted on the humidifier of FIG. 1.
Figure 8:
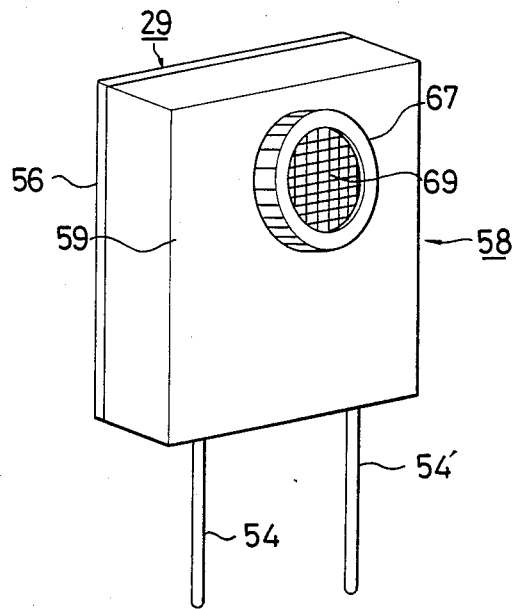
FIG. 8 is an outer perspective view of the humidity sensor of FIG. 7.
Figure 9:
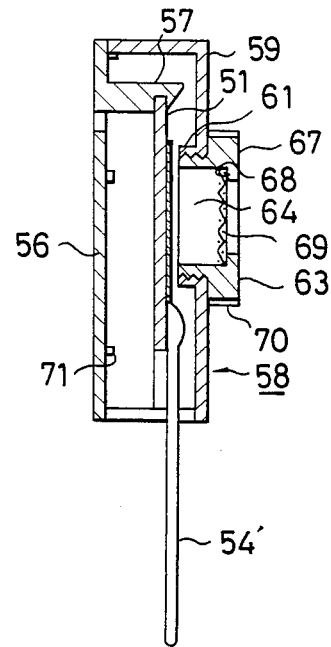
FIG. 9 is a vertical sectonal view of the humidity sensor of FIG. 7.

The humidity sensor 29 which is mounted on the circuit substrate 27 will now be described with reference to FIGS. 7, 8 and 9. On an alumina substrate 51, comb shaped electrodes 52 and 52' being spaced each other are printed. The alumina substrate 51 is prepared in such a manner that it is immersed first in a humidsensitive liquid agent and dried after it is removed from the humidsensitive liquid agent. Thus, the region between said electrodes 52 and 52' forms a humidsensitive portion 53 and the conductivity of the portion 53 is varied in response to the humidity. Lead-wires 54 and 54' are securely connected to said electrodes 52 and 52' by such a means as soldering at 55 and 55'. By enclosing the alumina substrate 51 with a casing 58 and a covering member 56, the humidity sensor 29 is formed. The covering member 56 is provided with a holder 57 for holding the upper end of said alumina substrate 51. The casing 58 which is open downwardly and backwardly has a filter attaching aperture 60 on the central portion of the front wall 59 in such a manner that the aperture is faced to said humidsensitive portion 53 when the alumina substrate 51 is mounted inside the casing 58. The attaching aperture 60 is provided with a cylindrical sleeve 61 extending inwardly and the inner circumferential surface of the sleeve 61 is tapped with a screw thread 62.

A filter holder 63 has a hollow space 64 for detecting the humidity and comprises a fitting cylindrical portion 66 formed with a screw thread 65 on the outer circumference for screw fitting into the screw thread 62 and an enlarged knob portion 67. On a stepped portion 68 of the filter holder 63, a filter 69 for removing dust is fixed in said hollow space 64. The outer circumference of the knob portion 67 of the holder 63 is notched to form a slip-proof surface 70.

The manner for assembling the humidity sensor 29 will now be described. The upper end of the alumina substrate 51 soldered with leadwires 54 and 54' to the electrodes 52 and 52' at 55 and 55' is securely attached to the covering member 56 by the holder 57. The covering member 56 attached with the alumina substrate 51 is then mounted on the casing 58. A plurality of projections 71 may be provided on the inner surface of the covering member 56 so as to these projections 71 being come into contact with the inner side surface of the casing 58 when the covering member 56 and the casing 58 are assembled. The, the filter holder 63 attached with the filter 69 is screw fitted to the casing 58 by rotating the manipulating knob 67 so as to the screw thread 65 tapped on the fitting cylindrical portion 66 of the holder 63 is threadably engaged into the screw thread 62 of the casing 58. When the filter 69 is made unavailable by the adhesion of dust, the filter holder 63 may easily be exchanged for new one by rotating said manipulating knob 67 reversely to disengage the filter holder 63 from the attaching operture 60 and attaching the new filter holder.

The humidity sensor 29 assembled as described above is mounted, as shown in FIGS. 3, 4 and 5, on the circuit substrate 27 with the filter holder faced downwardly.

An electric circuit of the ultrasonic humidifier according to the present invention formed on the circuit substrates 27 and 42 will now be described with reference to FIG. 10. An input coil 82 of the stepdown transformer 30 is connected to a power supply 33 of AC 100 V through a power switch 9. One of the output coil 84 of said transformer 30 is coupled to a smoothing capacitor 86 through a diode 85, one of the electrodes of said capacitor 86 being connected to the earth.

A relay 88 which is a constituent of a controlling circuit 87 is served to supply or interrupt the power to the oscillating circuit 10 for oscillating the ultrasonic oscillator 15, one of the terminals of the relay 88 being connected to a junction A of the diode 85 and the capacitor 86. The collector of a transistor 89 is connected to the other terminal of said relay 88 while the emitter is connected to the earth and the base is connected to comparators 92 and 94, which will be described hereinafter, respectively through rsistors 91 and 93. Thus, the oscillator 15 is energized or disenergized through the the relay 88 being operated in response to the output of the transistor 89 which is controlled by the outputs of the comparators 92 and 94.

A transistor 95 is served to supply a power to humidity displaying lamps. The emitter of the transistor 95 is connected to the junction A through resistors 96 and 97 while the base is connected to a Zener diode 98 and a resistor 99 and the collector is connected in series to light emitting diodes 100, 101, 102, 103 and 104 which are served as displaying lamps for displaying the humidity. By the use of these light emitting diodes, the humidities ranged from 30 to 70% are displayed.

One of the terminals of the humidity sensor 29 is coupled, through voltage dividing resistors 106 and 107, to the output terminals of the other output coil 105 of the transformer 30 while the other terminal of said humidity sensor 29 is connected through a resistor 108, a capacitor 109, a diode 110 and a capacitor 111 to the earth. Between the capacitor 109 and the earth, there are also connected a reversely directed diode 112 and a capacitor 113 in parallel.

An non-inverting input terminal of an amplifier 114 is connected through a resistor 115 and a variable resistor 116 to the earth as well as connected to a junction B between the diode 110 and the capacitor 111. The inverting input terminal of the amplifier 114 is connected through a rsistor 117 to the earth as well as connecterd through a resistor 118 to the output terminal of said amplifier 114.

Non-inverting input terminals of comparators 120, 121, 122 and 123 constituting a displaying circuit are connected through resistors 124, 125, 126 and 127, respectively, to said the other terminal of the thermosensor 41 as well as connected through resistors 128, 129, 130 and 131, respectively, to their own output terminals. Further, the inverting input terminal of the comparator 123 is connected through resistors 123 and 133, a diode 134, and a resistor 135 to one of the terminals of said output coil 105. A smoothing capacitor 136 is also connected between a junction C of the diode 134 and the resistor 133, and the earth.

The inverting input terminal of the comparator 120 is connected through a resistor 137 to that of the comparator 121, the latter is then connected through a resistor 138 to that of the comparator 122 and the latter is further connected through a resistor 139 to a junction D between the inverting input of the comparator 123 and a resistor 132, and the inverting input terminal of said comparator 120 is also connected through a resistor 152 to the earth so that the reference voltages of these amplifiers 120, 121, 122 and 123 are stepped up in turn. By such a construction of the circuit, a divided potential caused by a voltage fed from the humidity sensor 29 and amplified by the amplifier 114 and an output voltage of the thermosensor 41 will be fed to the non-inverting input terminals of the comparator 120, 121, 122 and 123 and compared with the reference voltages stepped up in turn. Accordingly, the light emitting diodes 101, 102, 103 and 104 will be energized through diodes 140, 141, 142 and 143 respectively and emit light when some voltages of higher levels are emerged in turn on the outputs of the comparators 120, 121, 122 and 123.

The variable resistor 11 of which the resistance is variable by the manipulation of the humidity setting lever 7 setting the room humidity is connected on one end to the resistor 133 and the other end is connected to the earth while a movable arm is connected to the non-inverting inputs of the comparators 92 and 94 respectively through resistors 144 and 145. A resistor 146 is connected between the input and output terminals of the comparator 92 and a capacitor 147 served as a noise filter is coupled between the input terminals of the comparator 92.

Thus, the output which is fed from the humidity sensor 29 and amplified by the amplifier 114 will be compensated by the thermosensor 41 and fed to the inverting input terminal of the comparator 92 through a resistor 148.

The inverting input terminal of said comparator 94 is connected to a junction F of a resistor 150 and a resistor 149, the other end of the latter being connected to the output coil 105, and a capacitor 151 served as a noise filter is coupled between the input terminals of the comparator 94.

A preferential control circuit 153 comprising the resistors 93 and 145, the capacitor 151 and the comparator 94 is provided to force the control circuit 87 in operation irrespective of the output fed from the humidity sensor 29 when the humidity setting lever 7 is set in the "continue" position of the humidity display on the humidity displaying portion 8.

The operation of the ultrasonic humidifier constituted such as described above will now be described. By the clockwise rotation of the manipulating knob 6, the power switch 9 is closed and a stepped down power supply is emerged on the output coil 105 of the step-down transformer 30. The output of said power supply is fed through the resistor 135 to the diode 134. After the half-wave rectification through the diode 134, it is smoothed by the capacitor 136 and fed to the non-inverting input terminal of the comparator 92 through the resistor 133, the variable resistor 11 and the resistor 144 as well as fed to that of the comparator 94 through the resistor 145 as a direct current power supply. Furthermore, said direct current power supply is fed to the inverting input terminal of the comparator 123 through the resistor 132 while it is also fed to the inverting input terminals of the comparators 120, 121 and 122 respectively through the resistors 139, 138 and 137.

The output of said output coil 105 is also fed to the diode 110 through the resistor 106, the humidity sensor 29, the resistor 108 and the capacitor 109. After the half-wave rectification through the diode 110, it is fed to the non-inverting input terminal of the amplifier 114 as a direct current power supply smoothed by the capacitor 111. Thus, the voltage fed to the non-inverting input terminal of the amplifier 114 is the output of the humidity sensor 29 resulted by detecting the room humidity and the lower the room temperature, the lower the output voltage of the humidity sensor 29, and vice versa, provided the room humidity is kept constant. The output of the humidity sensor 29 is linearly amplified through the amplifier 114 and fed to said the other terminal of the thermosensor 41 through the resistor 119. In such a manner, the output compensated by the thermosensor 41 is fed to the non-inverting input terminals of the comparators 120, 121, 122 and 123 respectively through the resistors 124, 125, 126 and 127 as well as fed to the comparator 92 through the resistor 148.

Thus, the change of the output of the humidity sensor 29 caused by the temperature change which is the characteristic of the humidity sensor 29 may be compensated by the thermosensor 41. For example, if the room temperature is higher, the humidity sensor 29 will take a lower resistance by the affections not only of the humidity but also of the temperature while the thermosensor 41 will take also a lower resistance so that the potential on the junction E will be lowered whereby said change may be compensated.

The operation of the displaying circuit in which the light emitting diodes 100, 101, 102, 103 and 104 of the humidity displaying portion 8 are caused to emitting light depending on the output of the humidity sensor 29 compensated by the thermosensor 41 will now be described.

The compensated output of the humidity sensor 29 is fed to the non-inverting input terminals of the comparators 120, 121, 122 and 123 respectively through the resistors 124, 125, 126 and 127. When the room humidity is less than 40%, since the input levels of the inverting input terminals of the comparator 120, 121, 122 and 123 are higher than that of the non-inverting input terminals of these comparators, the outputs of these comparators are of low levels. Furthermore, since the transistor 95 is fed the output of the output coil 84 through the diode 85 and the resistors 97 and 96, and is therefore rendered conductive while the output of said comparator 120 is of low level, the diode 140 is rendered conductive and the light emitting diode 100 emits light displaying that the present humidity is 30%. Accordingly, the light emitting diode 100 emitting light when the humidity is less than 40% may be utilized as a power displaying lamp.

The operation in which the light emitting diodes 101, 102, 103 and 104 are lighted in turn with the gradual increase of the room humidity will now be described. If the humidifying operation, which will be described hereinafter, is continued, the potential on the junction E is elevated gradually with the gradual depression of the resistance of the humidity sensor 29 so that the potential on the junction E will exceed the reference potential of the comparator 120, 121, 122 and 123 in turn. Then, for example, if the input level of the non-inverting input terminal of the comparator 120 exceeds the reference potential, the output of the comparator 120 will be in high level while the output of the comparator 121 will be in low level so that the diode 141 may be rendered conductive and the light emitting diodes 100 and 101 may be lighted displaying that the humidity is 40%. In such a manner, the lighting of the light emitting diodes 100, 101, 102, 103 and 104 may be controlled depending on the output levels of the comparators 120, 121, 122 and 123 so that the display of the humidity up to 70% may be possible. If the room humidity is decreased gradually, the operation may of course be reversed.

The operation of controlling the humidity by the humidity setting will now be described. When the humidity setting lever 7 is set at an arbitrary position for example about 40% of the humidity, the resistance of the variable resistor 11 is changed and the output of the output coil 105 is fed to the non-inverting input terminal of the comparator 92 through the variable resistor 11 and the resistor 144. Also, the output of the humidity sensor 29 compensated with the thermosensor 41 is fed to the inverting input terminal of said comparator 92. Thus, the comparator 92 compares these inputs fed to its input terminals and a resulting compared output is fed to the controlling circuit 87. Thus, if the input level of the non-inverting input terminal is higher that is if the detected value of the humidity is lower than the setting humidity of 40%, a high level output of the comparator 92 is fed to the gate of the transistor 89 through the resistor 91. The transistor 89 is then rendered conductive and the relay 88 is energized so as to the power is supplied to the oscillating circuit 10 whereby the ultrasonic oscillator 15 is driven. Therefore, if the output of the humidity sensor 29 compensated by the thermosensor 41 is lower than the output of the setting humidity, the ultrasonic oscillator 15 will be driven as soon as the power switch 9 is closed. Thus, a water crest is made on the surface of the water in the atomizing vessel 16 by the atomization of water and the air flow sucked from the inlet 123 by the blower 25 is risen together with atomized mist through the exhaust duct 34 and exhausted into the room through the output 37 of the splaying duct 36.

By humidifying the room in such manner, the resistance of the humidity sensor 29 is gradually depressed so that the potential on the junction E of the electric circuit is elevated gradually. As a result, if the potential exceeds the input level of the non-inverting input terminal of the comparator 92, the transistor 89 is rendered non-conductive so that the operation of the ultrasonic oscillator 15 is ceased. Of course, the comparator 92 may be operated thereafter in response to the changing output of the humidity sensor 29 so as to control the oscillator 15. The operative range of the comparator 92 may be adjusted by adjusting the resistance of the resistor 146. When the setting humidity is set, for example, for 40%, the output of the comparator 92 may be in high level for the detected output of the humidity sensor 29 compensated by the thermosensor 41 corresponding to the value of the humidity up to 42% and may thereafter be in low level for that corresponding to the value of the humidity down to 38% so as to the humidity of 40% may be retained. In such a manner, the room humidity may be retained at the set value.

Figure 2:
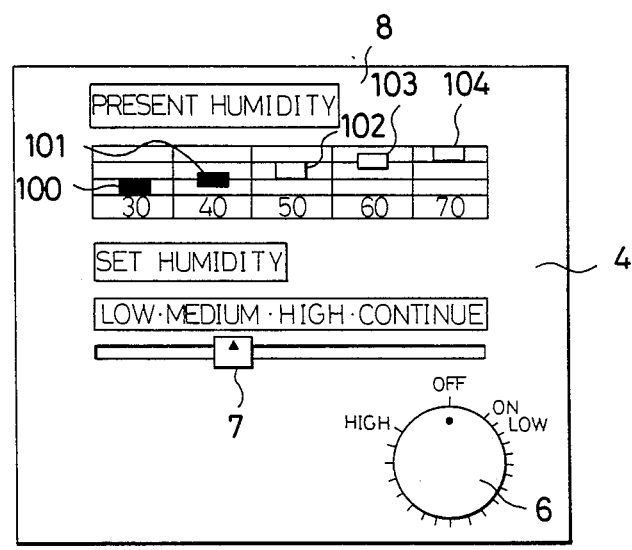
FIG. 2 is an enlarged schematic illustration of the operating portion of FIG. 1.

When a rapid humidification is wanted, the humidity setting lever 7 is moved to the "continue" position shown in FIG. 2. Then, the resistance of the variable resistor 11 is varied so as to the input level fed to the non-inverting input terminal of the comparator 94 is raised. The output of the comparator 94 having the potential on the junction F between the resistors 149 and 150 as the reference potential is then be in high level since the input level of the non-inverting input terminal exceeds the reference potential corresponding to the value of the humidity of over 70%. Thus, by moving the humidity setting lever 7 to the "continue" position, the transistor 89 is forced to conduct irrespective of the output of the humidity sensor 29 compensated by the thermosensor 41. Accordingly, the relay 88 is energized so as to the ultrasonic oscillator 15 is driven by the oscillating circuit 10. In such a manner as has been described, the rapid humidification is enabled.

Furthermore, since the output terminals of the comparators 92 and 94 are connected to the base of the transistor 89 respectively through the resistors 91 and 93, if the humidity is set less than 70% the output of the comparator 94 is kept in low level and the transistor 89 is controlled only by the output of the comparator 92 without subjecting the affection by the output of the comparator 94 so as to the normal controlling of the humidity is enabled.

While the preferred form of the present invention has been described, it is to be understood that various modifications are possible without departing from the spirit of the present invention. For examle, although the operations for such as the compensation of the humidity, the preferential control for the case in which the humidity setting is set "continue" and the comparisons for controlling and displaying the humidity are realized by using the analogue circuits in the embodiment described above, these operations may also be realized by using the micro-computers.

What is claimed is:

1. An ultrasonic humidifier, which comprises:
    a vessel for holding water;
    an ultrasonic oscillator for atomizing the water contained in the vessel;
    a blower for supplying the atomized water to a room in which the humidifier is used;
    a humidity sensor for detecting the humidity in the room, the humidity sensor providing an output signal representative of the humidity in the room;
    a thermosensor for detecting the temperature in the room;
    means for setting the humidity in the room to a desired value;
    means for compensating the humidity in which the output signal of the humidity sensor is compensated by the thermosensor;
    means for comparing the value of the humidity compensated by the humidity compensating means with the desired value of the humidity set by the humidity setting means, the comparing means providing a compared result;
    means for controlling the operation of the ultrasonic oscillator in accordance with the compared result of the comparing means;
    means for displaying the humidity in the room in response to the humidity compensated by the humidity compensating means; and
    means for preferentially controlling the operation of the ultrasonic oscillator so that if the humidity is set at a desired value which exceeds a predetermined uppermost humidity setting, the ultrasonic oscillator will be operated continuously irrespective of the compared result obtained by the comparing means.

2. An ultrasonic humidifier as defined by claim 1, wherein the humidity displaying means displays the humidity in the room up to a predetermined maximum humidity value; and wherein the predetermined uppermost humidity setting is selected to be substantially equal to the predetermined maximum humidity value.

3. An ultrasonic humidifier, which comprises:
    a vessel for holding water;
    an ultrasonic oscillator for atomizing the water contained in the vessel;
    a blower for supplying the atomized water to a room in which the humidifier is used;
    a humidity sensor for detecting the humidity in the room, the humidity sensor providing an output signal representative of the humidity in the room;
    a thermosensor for detecting the temperature in the room;
    means for setting the humidity in the room to a desired value;
    means for compensating the humidity in which the output signal of the humidity sensor is compensated by the thermosensor;
    means for comparing the value of the humidity compensated by the humidity compensating means with the desired value of the humidity set by the humidity setting means, the comparing means providing a compared result;
    means for controlling the operation of the ultrasonic oscillator in accordance with the compared result of the comparing means; and
    means for preferentially controlling the operation of the ultrasonic oscillator so that if the humidity is set at a desired value which exceeds a predetermined uppermost humidity setting, the ultrasonic oscillator will be operated continuously irrespective of the compared result obtained by the comparing means.

4. An ultrasonic humidifier, which comprises:

a vessel for holding water;

an ultrasonic oscillator for atomizing the water contained in the vessel;

a blower for supplying the atomized water to a room in which the humidifier is used;

a humidity sensor for detecting the humidity in the room, the humidity sensor providing an output signal representative of the humidity in the room;

a thermosensor for detecting the temperature in the room;

means for setting the humidity in the room to a desired value;

means for compensating the humidity in which the output signal of the humidity sensor is compensated by the thermosensor;

means for comparing the value of the humidity compensated by the humidity compensating means with the desired value of the humidity set by the humidity setting means, the comparing means providing a compared result;

means for controlling the operation of the ultrasonic oscillator in accordance with the compared result of the comparing means; and means for displaying the humidity in the room in response to the humidity compensated by the humidity compensating means.

5. An ultrasonic humidifier according to claim 4 characterized in that said means for displaying the humidity is provided with a plurality of displaying lamps.

6. An ultrasonic humidifier according to claim 5 characterized in that said means for displaying the humidity comprises a plurality of means for comparing respectively having different reference potentials in turn and the value compensated by said means for compensating the humidity being fed to said plurality of means for comparing so as to said displaying lamps being lighted in turn according to the result of comparing with the respective reference potentials.

7. An ultrasonic humidifier, which comprises:

a vessel for holding water;

an ultrasonic oscillator for atomizing the water contained in the vessel;

a blower for supplying the atomized water to a room in which the humidifier is used;

a humidity sensor for detecting the humidity in the room, the humidity sensor providing an output signal representative of the humidity in the room;

a thermosensor for detecting the temperature in the room;

means for setting the humidity in the room to a desired value;

means for compensating the humidity in which the output signal of the humidity sensor is compensated by the thermosensor;

means for comparing the value of the humidity compensated by the humidity compensating means with the desired value of the humidity set by the humidity setting means, the comparing means providing a compared result; and means for controlling the operation of the ultrasonic oscillator in accordance with the compared result of the comparing means;

the humidifier having formed therein an air passage, the air passage being in communication with the blower to allow air to flow therethrough, the humidity sensor being situated within the air passage;

the humidifier further including a humidity detecting chamber formed therein, the thermosensor being situated within the humidity detecting chamber;

the humidity setting means including a humidity setting lever, the humidifier including a sidewall having an aperture formed herein;

the humidity setting lever being received by the aperture, the aperture being in communication with the air passage.

8. An ultrasonic humidifier, which comprises:

a vessel for holding water;

an ultrasonic oscillator for atomizing the water contained in the vessel;

a blower for supplying the atomized water to a room in which the humidifier is used;

a humidity sensor for detecting the humidity in the room, the humidity sensor providing an output signal representative of the humidity in the room;

a thermosensor for detecting the temperature in the room;

means for setting the humidity in the room to a desired value;

means for compensating the humidity in which the output signal of the humidity sensor is compensated by the thermosensor;

means for comparing the value of the humidity compensated by the humidity compensating means with the desired value of the humidity set by the humidity setting means, the comparing means providing a compared result; and means for controlling the operation of the ultrasonic oscillator in accordance with the compared result of the comparing means;

the humidity sensor including a sensing surface, a casing covering the sensing surface, the casing having formed therein an aperture positioned in alignment with the sensing surface, a filter holder, a filter mounted to the filter holder, the filter holder including a manipulating knob mounted thereto, the filter holder being received by the aperture.

* * * * *